Jan. 10, 1967   R. T. CORNELIUS   3,297,196
BOTTLE CARRIER
Filed May 6, 1965   2 Sheets-Sheet 2
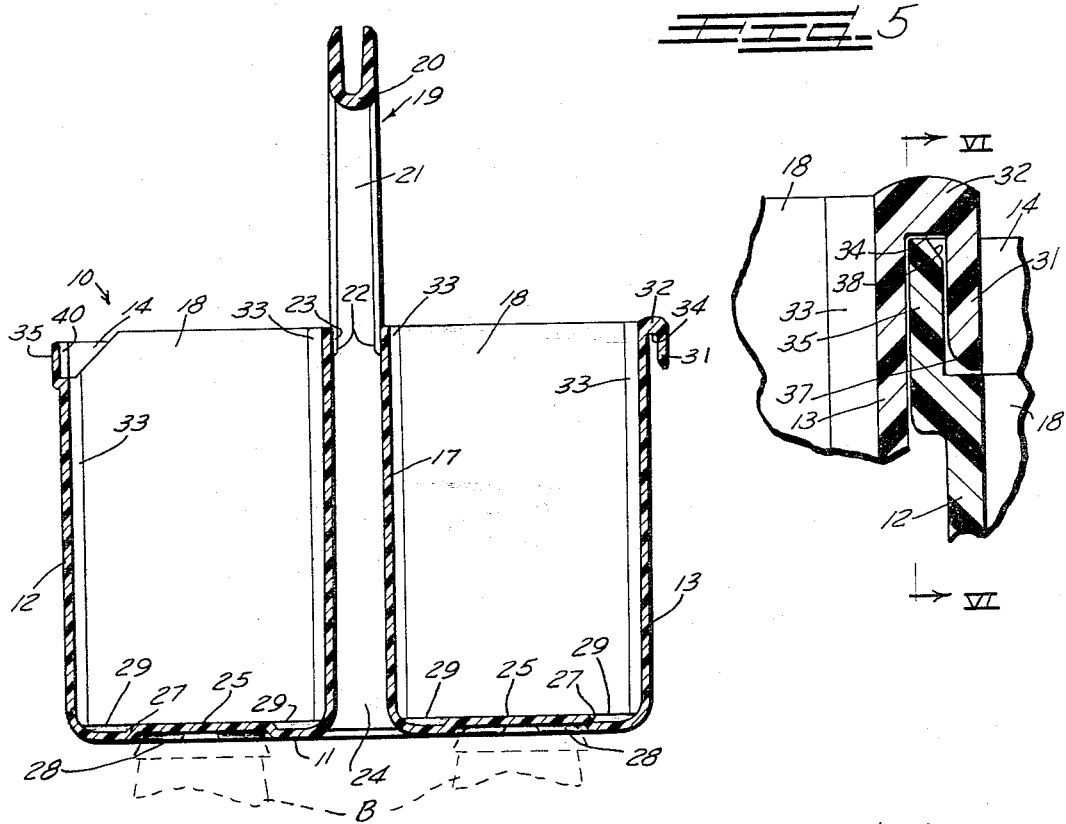
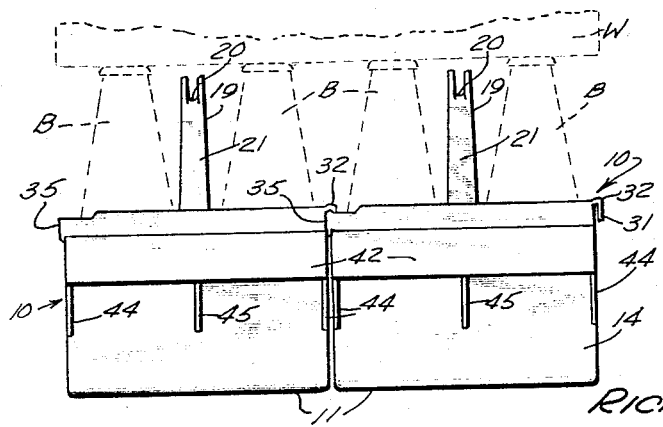
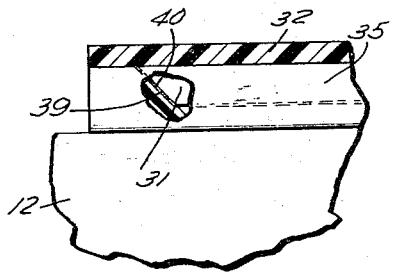
INVENTOR.
RICHARD T. CORNELIUS United States Patent Office 3,297,196
Patented Jan. 10, 1967

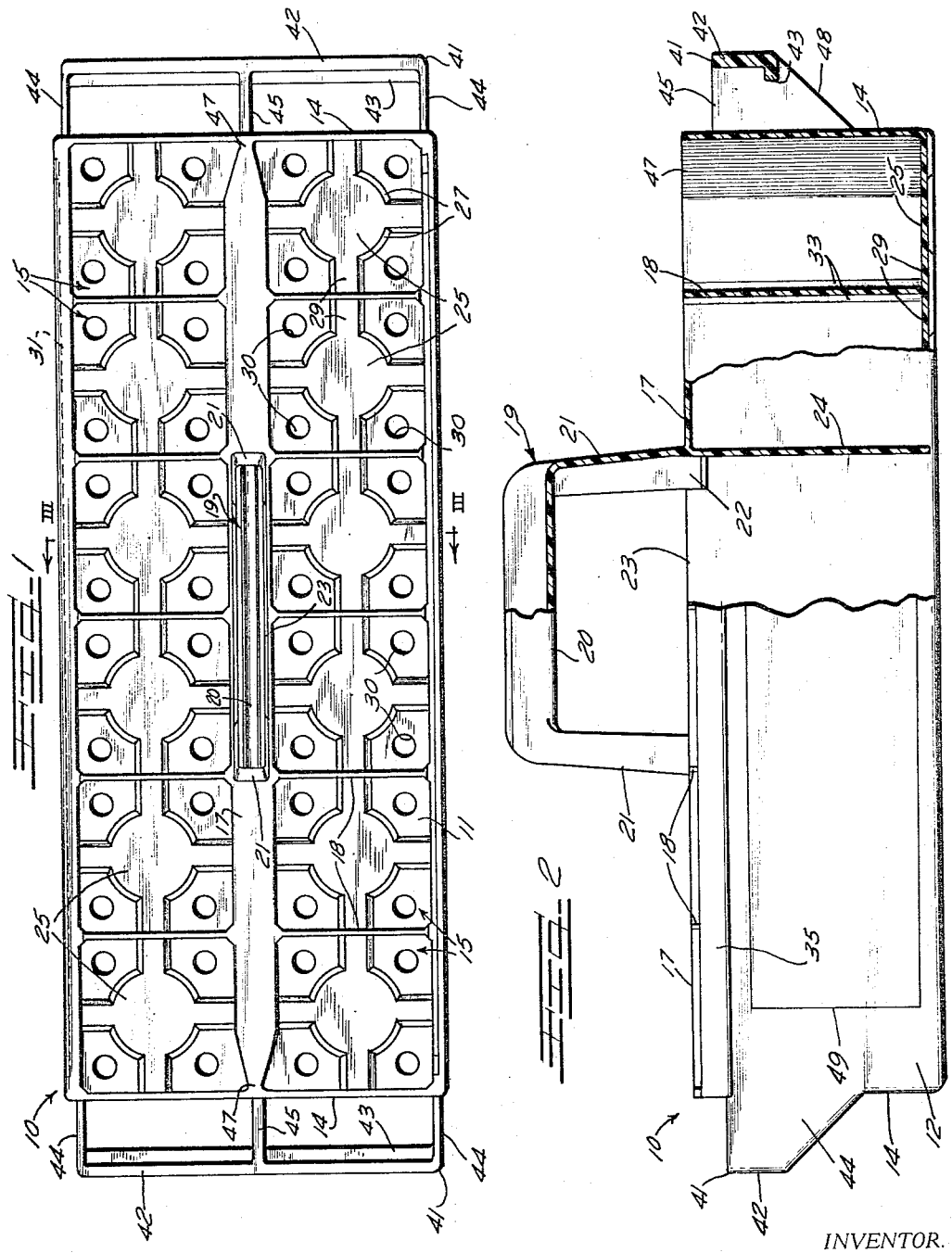

3,297,196
BOTTLE CARRIER
Richard T. Cornelius, Minneapolis, Minn., assignor to The Cornelius Company, Anoka, Minn., a corporation of Minnesota
Filed May 6, 1965, Ser. No. 453,631
15 Claims. (Cl. 220—102)

This invention relates to improvements in bottle carriers or cases molded from suitable plastic material such as high density polyethylene, and is more particularly concerned with a novel plastic carrier construction for handling, distribution and sale of beverages in crown-capped bottles, the carrier being capable of being handled and filled in bottling equipment designed for conventional twenty-four bottle wooden cases; but possessed of an important advantage over the wooden cases in that this plastic carrier is readily sectionally separable into a plurality of individual, fully self-contained units of predetermined bottle capacity, such as 12-packs, for supplying the self-service trade.

Purchasers of bulk quantities of bottled beverages in the self-service retail trade are largely women, and often children, who find it impossible or at least inconvenient due to bulk and weight to handle the standard twenty-four bottle cases in which bottlers of beverages can most economically process the popular six to ten ounce bottle range. Washing, handling and filling equipment in the beverage bottling works, supporting racks in transportation conveyances such as delivery trucks, and the like, are conventionally designed and proportioned to accommodate the twenty-four bottle wooden carrying cases.

For the bulk purchase self-service market, therefore, paper carriers having convenient handles and which will support a reasonable load of filled beverage bottles have been devised for quantity sales within the physical limits of the paper carriers to withstand the load, and in suitable subdivisions of twenty-four, most generally six-packs and sometimes eight-packs. These are processed by the bottler, transported, and delivered to the retailer in wooden trays containing four of the six-packs or three of the eight packs.

Generally the outside surfaces of the tray walls are provided with advertising indicia intended to promote sales of the particular beverage. However, when the retailer receives the loaded trays, they are usually unloaded and the bottle-packs stacked in a sales and display area and the trays removed to a storage room. Therefore, the bottler receives little if any value from the tray-carried advertising because the retail purchaser rarely, if ever, sees the trays.

It is therefore a prime object of the present invention to provide a new bottle carrier or case structure desirably of a one-piece molded plastic construction which will serve directly as a bulk retail sales bottle-pack, avoids the need for carrying trays to transport the same to the retail outlet, is adapted for handling and bottle-filling in beverage bottling works equipment designed for twenty-four bottle wooden cases, can be transported in the supporting rack designed for twenty-four bottle wooden carriers in transportation conveyances such as delivery trucks and can be handled by the bottling works personnel and truckers much the same as the wooden cases, and on reaching the retailer provides bottle-packs of larger unit volume than possible with the paper carriers but nevertheless of convenient size and loaded weight to cater to self-service bulk purchasers such as women and children.

Another object of the invention is to provide a new and improved plastic 12-pack bottle carrier constructed and arranged to be coupled in paired relation with a like 12-pack carrier to afford an assembly which can be handled in the conventional bottling equipment for twenty-four bottle wooden cases and can be manipulated substantially as a twenty-four bottle case but is readily separable from its companion for bulk retail sales purposes, all without the need for any auxiliary or supporting or carrying tray, whereby advertising and identifying indicia thereon are directly effective throughout a cycle of handling of the carrier from bottler to retail purchaser.

A further object of the invention is to provide a new and improved bottle carrier or case structure of the character described adapted to be made in one-piece molded plastic units, utilizing minimum material and especially devised for high speed, economical production between a pair of mating separable forming dies, entirely eliminating any need for slides or other auxiliary die parts in forming any structural feature of the carrier units.

Still another object of the invention is to provide a new and improved molded plastic bottle carrier structure of 12-pack size adapted to be used as an individual unit or coupled with another such unit to provide a composite carrier assembly adapted to be randomly interchangeably processed with twenty-four bottle wooden carriers and when filled to be randomly stacked with such wooden carriers, if desired.

Yet another object of the invention is to provide a new and improved molded plastic bottle-carrier embodying a novel separable twin unit assembly.

A yet further object of the invention is to provide in a plastic bottle-carrier construction novel means for connecting separable units in a composite carrier assembly.

A still further object of the invention is to provide a novel molded plastic carrier construction affording all of the capabilities of a twenty-four bottle carrier but which is convertible at will into a 12-pack carrier and which entirely eliminates any need for paper carriers and supporting trays therefor.

It is also an object of the invention to provide novel handle structure in a one-piece molded plastic bottle carrier.

An additional object of the invention is to provide a new and improved thin-shell, substantially rigid molded plastic bottle-carrier structure having novel features affording length and width compensation enabling mixed, at random interchangeable use with wooden carriers of the same capacity.

Other objects, features and advantages of the present invention will be readily apparent from the following detailed description of a perferred embodiment thereof, taken in conjunction with the accompanying drawings, in which:

FIGURE 1 is a top plan view of a bottle carrier or case unit embodying features of the invention;

FIGURE 2 is a side elevational view, partially broken away and in section of the unit;

FIGURE 3 is an enlarged vertical sectional detail view taken substantially on the line III—III of FIGURE 1;

FIGURE 4 is an end elevational view of a pair of the carrier units connected to afford a paired carrier assembly adaptable for interchangeable and even at random handling and filling with wooden carriers in a bottling plant and handling in the same transportation equipment as the wooden carriers as well as capable of being stacked randomly with wooden carriers when convenient or necessary;

FIGURE 5 is an enlarged fragmentary sectional detail view showing the manner in which the connecting means of the paired carrier units coact; and FIGURE 6 is a sectional elevational view taken substantially on line VI—VI of FIGURE 5.

In the embodiment of the invention selected for illustration, a bottle-carrier construction is provided comprising individual, self-contained units, each of which is adapted to support a given number of bottles, for example twelve, so that it will serve as a 12-pack carrier suitable for retail sales to domestic consumers and entirely eliminating any need for paper carriers and handling trays. Each of the 12-pack carrier units is constructed and arranged to be coupled separably with a companion identical unit to make up a twenty-four bottle case assembly for convenience in processing through standard bottling plant machinery in which twenty-four bottle wooden cases are adapted to be processed through washing, filling, loading, filled stacking, storage, and the like. Further, the coupled units are adapted to be loaded for transportation, transported and delivered to destination in substantially the same manner as wooden cases. By virtue of outside dimensional relationships, the coupled-twin carrier units can be, when filled, randomly handled with the like capacity wooden carriers for crown capped beverage bottles of the six to ten ounce size range.

Every feature of the illustrated example of the plastic carrier is adapted for one-shot molding in a die set consisting of but two opposed complementary die members free from any need for slides or inserts insofar as structural features are concerned. All surfaces which face generally toward the ends or sides of the carrier structure, as well as surfaces facing upwardly and downwardly, are fully oriented for shaping by corresponding die surfaces of either the upper or the bottom forming die section of the pair of forming dies, and with ample though minimum draft for ready separation of the rigidified molded carrier from the dies. All wall areas of the carrier lend themselves to essentially minimum shell wall section thickness throughout the structure. Plastic material on the order of high density polyethylene is contemplated in the molded, substantially rigid, self-sustaining structure and that is intended to be the connotation of the term "plastic" as used herein.

According to the present invention, a molded plastic bottle-carrier unit 10 is provided which corresponds in length and width substantially to one-half of the length and width of a standard wooden carrier for handling the same size range of crown capped bottles. To this end, the carrier 10 comprises a bottom or base wall structure 11 (FIGS. 1, 2 and 3), opposite spaced parallel side walls 12 and 13, and similar opposite end walls 14. As will be noted, juncture of the base wall 11 with the upstanding side and end walls is on respective radius juncture ribs which join at the vertical junctures of the walls which are also of a desirable rounded or radius juncture rib formation.

Within the tray-like receptacle area defined by the walls are means defining a plurality, and in this instance twelve, upwardly opening individual bottle-receiving cells 15. Such means comprise a longitudinal central integral divider 17 which extends between the end walls 14 upwardly from the base wall 11 and is in a top plane with the end walls. Integral with the respective opposite sides of the central longitudinal divider 17, and the respective opposite side walls 12 and 13 spaced therefrom, and rising integrally from the base wall 11 is a series of parallel transverse thin divider partitions 18 which are uniformly spaced with respect to each other and to the end walls 14 to receive beverage bottles in the cells 15. Desirably, the partitions 18 have their top edges in a plane with the longitudinal divider partition 17. This upper edge plane is not necessarily as high as the upper edge of a standard wooden carrier, but is adequate to afford stable support for the bottles to be carried therein.

In adidtion to its divider function, the longitudinal central partition 17 serves to compensate dimensionally in regard to the width of the carrier 10 for substantially equalizing orientation of the bottle-receiving pockets or cells 15 with those across the width of one-half of a conventional wooden carrier. For this purpose, the longitudinal divider 17 is throughout most of its length and except near its juncture with the end walls 14 of substantial predetermined width; and for economy in material and to facilitate molding is of a hollow construction affording a flat topped, downwardly opening rib with its side walls joining the base wall 11 on rounded or radius juncture rib formation.

To facilitate use of the bottle-carrier unit 10 as a 12-pack carrier an upstanding handle 19 is desirably provided which is conveniently attached to the hollow central divider 17, being shown as molded integrally therewith and located over the center of the carrier. In side elevation the handle 19 is of generally inverted U-shape and has a horizontal longitudinally extending hand-grip or handle bar 20 supported at a suitable elevation by end riser struts or legs 21. While the hand-grip bar 20 is of an upwardly opening generally U-shape cross-section, the legs 21 are of generally downwardly and inwardly opening U-shape cross-section. Integral connecting and reinforcing terminals 22 on the lower end portions of the side flanges of the legs 21 join them to the inner upper margins of the side walls defining the hollow longitudinal divider 17. Molding of the handle is facilitated by an upward opening 23 under and coextensive with the handle 19.

For reinforcement, respective vertical transverse web flanges 24 integrally join the side walls defining the hollow divider 17 and the juncture of the outer web portions of the legs 21 and the adjoining top portions of the divider 17. These web flanges 24 extend downwardly closely adjacent to the bottom wall 11 and integrally connect the contiguous edges of a respective pair of the divider webs 18 aligned therewith and with the adjoining end of the handle 19. Thereby an extremely well-balanced load distribution centering in the handle is attained. Further, although the center divider 17 is of hollow shell-rib structure, it is reinforcingly bridged at least adjacent to the upwardly and downwardly opening handle-well central portion thereof against forces that might tend to spread or collapse it. If desired, similar web flanges extending across the interior of the hollow divider 17 may connect the aligned divider webs 18 which are spaced from the handle 19 toward the opposite ends of the carrier.

By having the handle 19 narrower from the base of the legs 21 upwardy than the spacing afforded between the sidewalls of the divider 17 as well as shorter than the space between the vertical webs 24, and the height of the handle shorter than the height of the divider 17, reception of the handle within the hollow divider of a superposed carrier 10 during empty stacking of like containers is facilitated. The top of the internested handle thus remains clear of the hand-hole of the handle. In the stacked relationship, the base wall 11 will rest on the dividers 17 and 18 and the outside surfaces of the base end portions of the handle legs 21 will fit generally nestingly, for stacking registration, within the lower end of the downwardly opening well receptive thereof in the center divider 17 between the web flanges 24. At its top, the handle 19 extends above the base 11 to a height less than the tops of bottles B supported in the carrier (FIG. 4) whereby a wooden carrier W of standardized dimensions may be freely stacked thereon.

A substantial aggregate area of the base wall 11 lies in a common supporting plane to afford frictional surface to minimize undesirable slippage on a supporting surface. However, to maintain the base wall 11 of minimum practical molded section but with such reinforcement as to afford adequate bottle-supporting strength without sagging, an advantageous pattern of reinforcing ribs and flanges is provided on the base wall. To this end, the base wall areas in each of the cells 15 has a central upwardly offset preferably generally circular flat area 25 connected with the normal plane of the base wall 11 by means of a reinforcing offsetting tapered generally annular flange 27. This affords in the bottom of each of the cells a downwardly opening shallow pocket or socket recess 28 of a size to freely nestably receive the crown of a bottle cap as indicated in dash outline in FIGURE 3, when stacking such carriers with filled bottles B, or to receive the top ends of respective bottles when stacking carriers of empty bottles. Thereby, freedom from accidental slipping displacement of the stacked carriers either longitudinally or laterally from the stack is attained.

Further reinforcement of the base wall areas is attained by having a pattern of raised, downwardly hollow, shallow reinforcing ribs 29 which radiate symmetrically from the raised, offset areas 25 of the bottom wall 11. In a desirable arrangement, a pattern of four reinforcing ribs 29 radiates in equidistantly spaced relation from and in coplanar relation to the respective offset area 25 in each of the cells 15. These ribs 29 extend integrally through and in reinforcing relation to the divider webs 18 in the longitudinal aspect of the carrier and integrally join the side walls 12 and 13 and the longitudinal divider 17 in the transverse aspect of the carrier. Through this arrangement, not only is the bottom wall area within each of the cells thoroughly stiffened and reinforced, but stable bottom or base support for bottles is afforded in the cells. Drainage from the four depressed base wall corner areas in each of the cells 15 is accommodated by a respective drain hole 30 through the bottom wall in each such area.

Means for separably coupling of pairs of the carrier units 10 in order to afford a twenty-four bottle carrier assembly suitable for processing through the conventional bottling plant equipment are provided along the sides of the carrier units in a self-aligning structure enabling quick one-handed assembly and separation of the units and permitting the coupled-twin units to be handled together one-handed. To this end, one side wall, herein the side wall 13, is provided longitudinally therealong and desirably on its upper edge with an outwardly spaced integral downwardly extending coupling flange 31 (FIGS. 3–5). Joining the upper edge of the flange 31 with the upper edge of the side wall 13 is a rib-like web structure 32 of preferably heavier cross-section so as to be resistant to shear stresses at least equivalent to one of the carrier units 10 fully loaded with filled maximum sized bottles. As will be noted, the construction is such that the connecting web 32 at its inner side integrally joins the upper end portions of the end walls 14 and the divider webs 18. Additional reinforcement is attained by a moderate thickening side edge juncture reinforcement 33 of the divider webs 18 integral with the side wall 13. Similar such juncture reinforcement thickening 33 is desirably also present at the inner edges of all of the divider webs 18 integral with the center divider 17, as well as at juncture of the respective divider webs 18 with the side wall 12.

In the space between the depending coupling flange 31 and the side wall 13 and below the connecting web 32 is provided a downwardly and inwardly opening coupling socket channel or groove 34 having its inner surface aligned in a plane with the outer surface of the wall 13. A substantial depth is afforded for the coupling groove 34, determined by the length of the flange 31 to provide for adequate interlocking interengagement therein of an upstanding complementary coupling flange 35 provided on the upper end of the side wall 12 of the carrier unit 10 which is to be connected in companion or paired relation. Thus each of the carrier units has on one longitudinal upper edge the generally hook-like coupling flange 31 affording tthe coupling socket 34, and along its opposite side upper edge the upwardly projecting complementary coupling flange 35.

In order to have the outer vertical surface of the coupling flange 31 substantially flush with the inner surface of the side wall 12 in the coupled relationship of the flanges 31 and 35, the flange 35 is offset outwardly from the inner surface of the side wall 12 a distance substantially the same as the thickness of the flange 31. Both of the flanges 31 and 35 are desirably of at least the same thickness section as the thickness section of the side walls 12 and 13. Accordingly, the outwardly offset relationship of the outer surface of the flange 35 relative to the outer surface of the wall 12 is about the same as the thickness section of the side wall. This offset spacing of the flange 35, as well as the offset spacing of the flange 31 from its side wall 13 is coordinated with the width of the hollow central divider 17 in calculating the overall width of a coupled pair of the carrier units 10 to be substantially the same as the width of a wooden carrier or case W (FIG. 4). Also, the height of the top edge of the flange 35 from the lower face of the base wall 11 is predetermined for full reception within the interlock socket 34 while the coupled carriers are resting on a common supporting plane and with their lower base wall surfaces coplanar. Since the downwardly facing surface within the socket groove 34 is at a lower elevation than the top edges of the dividers and end walls, the top edge of the flange 35 is suitably lower, as best visualized in FIGURE 3.

Assembling of the coupling or interlock flanges 31 and 35 together is facilitated by a suitable, and in this instance rounded, cam surface 37 on the inner side of the lower margin of the flange 31 and a chamfered lead-in surface 38 on the outer side of the upper margin of the flange 35. In addition, in order to effect automatic longitudinally coextensive alignment of the coupled carriers, incident to joining the coupling flanges, the flange 31 is provided at its opposite longitudinal extremities with respective inwardly oblique, generally downwardly and outwardly facing longitudinal orientation and cam shoulders 39. In complementary relation, the side wall 12 adjacent to the longitudinally opposite end portions of the flange 35, and integral with the inner side of this flange, is provided with upwardly and inwardly facing respective camming and alignment shoulders 40. Through this arrangement, assembling of one of the carriers 10 with another such carrier can be effected quite simply.

One way of effecting coupled assembly of the carriers comprises moving the side wall 13 of the one carrier into position against the coupling flange 35 of the other container with the coupling flange 31 in clearance relation above and generally aligned with the socket defined by the flange 35 and the shoulders 40, and releasing the one carrier so that the coupling flange 31 drops into interlocking position. Another way of attaining a coupled relationship is to move the flange 35 of one of the containers into general alignment under the hooklike coupling flange 31 of another of the containers and then moving the flange 35 up into the socket 34. When the latter maneuver is effected through the handle 19 of the carrier which is moved into position, picking up therewith of the container which is thus coupled thereto is readily accomplished by continuing upward movement. The coupled relationship is of substantial advantage for conveniently carrying a double load, because two of the carriers 10 can be lifted by each hand, namely, a full twenty-four bottles by either hand when feasible or expedient to do so. If while the pair of carriers is being carried as an assembly, or while at rest it is desired to separate them or to remove one and not the other from a particular place, that one of the carriers which has the downward flange 31 in coupled or interlocked position can be lifted away from the other carrier without any more than the simple act of lifting, and without disturbance of the remaining carrier. Furthermore, when the coupled carriers 10 are resting upon a common surface, a transverse pull on either of the carriers will drag the coupled companion carrier with it, and a longitudinal pull on either of the coupled carriers will drag the other carrier along by virtue of the coupling opposition afforded by the respective coupling flange shoulders 39 and 40.

Inasmuch as the end walls 14 and the divider partitions 18 are individually and in the aggregate of much less bulk than the walls and partitions of a wooden carrier, extension means are provided on the carrier 10 to compensate for this difference. Actually, the length difference is of sufficient magnitude to enable the provision of an identical handle 41 at each end of the carrier and yet maintain the overall length substantially the same as that of a conventional wooden carrier. Each of the handles 41 comprises a horizontal handle bar 42 desirably extending across the full width of the associated end wall 14. Desirably, the handle bar 42 is of greater width vertically than the thickness and provided with a narrow stiffening flange 43 projecting inwardly along its lower edge. At its opposite ends, the handle bar 42 is integrally united with the adjacent end wall 14 through respective parallel flanges 44 which desirably are directly aligned with the respective side walls 12 and 13 and are of the same section in thickness. Centrally the handle bar 42 is integrally joined to the end wall 14 by a vertical connecting web flange 45 which is desirably of a thickness section the same as the adequate thickness section of the handle bar itself. Further, the integral connecting flange 45 is integral through the end wall 14 with the adjacent end of the longitudinal divider 17 which tapers to a solid end reinforcing juncture web 47 integral with the end wall 14. To enhance rigidity of the end handle structure for loaded lifting of the carrier through the handle bar 42 which is located adjacent to the top edge of the carrier, the lower end portions of the connecting flanges 44 and the central web 45 extend downwardly a substantial distance, with the lower edges 48 thereof tapering downwardly and inwardly from the handle bar. Through this arrangement, the handle bar 42 may be grasped either from above, or below for moving or carrying the carrier. Since the opposite ends of the handle bar 42 are coextensive with the opposite sides of the end wall of the carrier, the adjoining ends of the handles of coupled carriers are close together and if it is desired to lift the carriers in coupled relation through the end handles, two fingers of a grasping hand can be engaged with each of the handle bars 42 and the relatively thin contiguous side flanges 44 accommodated between the middle and ring fingers of the hand. Thereby the weight of the coupled carriers is substantially evenly distributed on the grasping hand.

Since the carrier 12 is provided for convenience of bulk self-service purchasers, it is desirably equipped with suitable advertising indicia which may be applied in suitable outer surface areas thereon such as in areas 49 (FIG. 2) on the side walls. Since the bottler who is promoting sale of the beverage supplied by means of the carrier 10 needs not provide identification or advertising indicia on carrying trays when the 12-pack carriers 10 are employed, substantial savings are effected, in addition to over-all savings effected because of the dual functions embodied in the carrier 10 avoiding the need for separate paper carriers and supporting carrier trays.

It will be understood that modifications and variations may be effected without departing from the scope of the novel concepts of the present invention.

I claim as my invention:

1. A one-piece molded shell plastic bottle-carrier comprising:
   (a) base, side and end walls defining an upwardly opening tray and dividers extending above said base and between said side and end walls and subdividing the tray into a plurality of upwardly opening bottle-receiving cells;
   (b) and means for assembling the carrier with another like carrier to provide a coupled-twin assembly and comprising a downwardly projecting hook-like flange structure extending longitudinally along the outer side of one of said side walls and defining a downwardly opening socket groove, and an upwardly extending interlock flange longitudinally along the outer side of the opposite side wall complementary to said downwardly projecting interlock flange and socket groove and adapted for interlocking interengagement within the socket groove of the downwardly projecting interlock flange of a like carrier.

2. A one-piece molded shell plastic bottle-carrier comprising:
   (a) base, side and end walls defining an upwardly opening tray and dividers extending above said base and between said side and end walls and subdividing the tray into a plurality of upwardly opening bottle-receiving cells;
   (b) handle means on said dividers enabling lifting carrying of the carrier;
   (c) handle means on said end walls enabling lifting carrying or pulling of the carrier;
   (d) a downwardly extending interlock flange along the upper edge of one of said side walls and spaced outwardly therefrom to define a downwardly opening longitudinally extending socket groove;
   (e) and an upwardly extending longitudinal interlock flange along the upper edge of the opposite side wall complementary to and adapted to interengage within the groove socket of a like carrier to enable lifting of both of the carriers by manipulation of said handle means.

3. A one-piece molded shell plastic bottle-carrier comprising:
   (a) base, side and end walls defining an upwardly opening tray and dividers extending above said base and between said side and end walls and subdividing the tray into a plurality of upwardly opening bottle-receiving cells;
   (b) handle means on said dividers enabling lifting carrying of the carrier;
   (c) handle means on said end walls enabling lifting carrying or pulling of the carrier;
   (d) a downwardly extending interlock flange along the upper edge of one of said side walls and spaced outwardly therefrom to define a downwardly opening longitudinally extending socket groove;
   (e) an upwardly extending longitudinal interlock flange along the upper edge of the opposite side wall complementary to and adapted to interengage within the groove socket of a like carrier to enable lifting of both of the carriers by manipulation of said handle means;
   (f) and respective cam shoulders on the opposite ends of said downwardly extending interlock flange and on the inner sides of the opposite end portions of said upwardly extending interlock flange functioning not only to align the interlocked carriers longitudinally but also to maintain the assembled relationship when pulling on said end wall handle means for moving the carrier longitudinally.

4. A one-piece molded shell plastic bottle-carrier comprising:
   (a) base, side and end walls defining an upwardly opening tray and dividers extending above said base and between said side and end walls and subdividing the tray into a plurality of upwardly opening bottle-receiving cells;
   (b) handle means on said dividers enabling lifting carrying of the carrier;
   (c) handle means on said end walls enabling lifting carrying or pulling of the carrier;
   (d) a downwardly extending interlock flange along the upper edge of one of said side walls and spaced outwardly therefrom to define a downwardly opening longitudinally extending socket groove;
   (e) an upwardly extending longitudinal interlock flange along the upper edge of the opposite side wall complementary to and adapted to interengage within the groove socket of a like carrier to enable lifting of both of the carriers by manipulation of said handle means;
   (f) and respective cam shoulders on the opposite ends of said downwardly extending interlock flange and on the inner sides of the opposite end portions of said upwardly extending interlock flange functioning not only to align the interlocked carriers longitudinally but also to maintain the assembled relationship when pulling on said end wall handle means for moving the carrier longitudinally;

(g) said handle means affording end extensions on the respective end walls to provide a total length for the carrier substantially equivalent to the length of a conventional wooden carrier of double the bottle capacity, and said interlock flanges providing an over-all width for the carrier which is substantially the same as one-half of the width of said conventional wooden carrier, so that when a coupled-twin assembly of the carriers is effected such assembly is adapted to be processed in bottling works handling and filling equipment devised for said conventional wooden carriers.

5. A molded plastic bottle-carrier comprising:
(a) base and upstanding walls defining a carrying tray and dividers subdividing the tray into a plurality of upwardly opening bottle-receiving cells;
(b) one of said dividers being of hollow rib construction;
(c) a generally U-shaped handle rising from said hollow rib divider and including a handle bar and end legs which are integral at their lower ends with said hollow rib divider;
(d) and reinforcing webs integral with the handle legs and extending integrally downwardly within and across the interior of said hollow rib divider and integrally aligned with transversely extending dividers which join the hollow rib divider at one of their ends and join the upstanding walls at their opposite ends, whereby lifting stresses are well distributed to said handle through said transverse dividers and said webs as well as said hollow rib divider.

6. A molded plastic shell bottle carrier of the character described comprising:
(a) a base having longitudinally extending side walls and end walls joined to provide an upwardly opening tray;
(b) a central longitudinally extending hollow rib divider integral with said bottom wall and joining said end walls and at least at juncture with one of said ends walls tapering to a solid central juncture;
(c) and a handle on the outside of said one end wall including a handle bar extending parallel in spaced relation to said end wall and substantially coextensive with the width of said end wall, longitudinally extending end flanges integrally joining said handle bar and aligned with said side walls, and a central reinforcing and connecting web flange joining said handle bar centrally with said solid end juncture of said divider.

7. In a molded plastic bottle-carrier of the character described:
(a) a carrier body comprising a base and upstanding walls;
(b) and a handle structure on one of said upstanding walls comprising a handle bar of generally L-shape cross-section spaced from such wall and having a vertical bar portion of substantial vertical width in spaced parallel relation to said wall and a lower inwardly extending shorter reinforcing flange portion, and inwardly extending spaced apart vertical reinforcing and connecting webs integrally joining the handle bar with said walls.

8. In a bottle carrying assembly of the character described:
(a) a pair of bottle carrying units, means releasably coupling said units in coextensive alignment and with respective end walls on the units transversely aligned;

(b) and each of said end walls having a handle thereon extending transversely and spaced outwardly therefrom and having respective end portions in adjacency so that both of the handles can be grasped by a single manipulating hand for manipulating the coupled units as an assembly.

9. In a molded plastic 12-pack bottle carrier dimensioned to occupy substantially one-half of the space of a twenty-four bottle wooden carrying case for the same size range of beverage bottles:
(a) a base wall and side and end walls of thin cross-section and defining an elongated upwardly opening tray;
(b) a central longitudinally extending hollow rib divider joined at its opposite ends to said end walls and opening downwardly through said base wall;
(c) a handle rising integrally from the central portion of said longitudinal divider, with an opening through the top of the divider under the handle;
(d) transverse thin dividers rising from said base wall and joining the side walls and said longitudinal divider and cooperating with one another and with said end walls to divide the tray into two equal parallel rows of substantially equal bottle-receiving cells;
(e) upwardly offset reinforcing and downwardly opening bottle top receiving socket defining respective central areas in each of the cells and having coplanar raised longitudinally and laterally radiating reinforcing ribs raised from the base wall and radiating from said central areas and joining respectively with said dividers and said side and end walls, as the case may be;
(f) handles integral with and projecting endwise from said end walls and affording dimensional compensation with said end walls to cover a length equal to said wooden carrying case;
(g) and coupling structure on said side walls comprising an interlock flange projecting downwardly on one of said side walls and a complementary interlock flange projecting upwardly on the other of said side walls and adapted for interlocking interengagement with the complementary flange of another like carrier, said interlock flanges extending outwardly to a predetermined dimension such that in the coupled relation two of the carriers occupy substantially the same space as a twenty-four bottle wooden carrying case.

10. In an assembly comprising a pair of bottle carriers each of which has provision for a plurality of upstanding bottles:
(a) one of the carriers having an upwardly horizontally elongated interlock flange and the other of the carriers having a downwardly extending horizontally elongated interlock flange defining an elongated groove complementary to and receptive of the upwardly extending interlock flange, and said interlock flanges being interlocked whereby said carriers are adapted to be lifted together by lifting said one carrier;
(b) and at least said one carrier having handle means for manipulating the two carriers in assembly.

11. In a molded plastic 12-pack bottle carrier dimensioned to occupy substantially one-half of the space of a twenty-four bottle wooden carrying case for the same size range of beverage bottles:
(a) a base wall and side and end walls of thin cross-section and defining an elongated upwardly opening tray;
(b) a central longitudinally extending upwardly projecting divider joined to said base wall and at its opposite ends to said end walls;
(c) a handle rising from said longitudinal divider;
(d) transverse thin dividers rising from said base wall and joining the side walls and said longitudinal divider and cooperating with one another and with said end walls to divide the tray into two equal parallel rows of substantially equal bottle-receiving cells;

(e) handles integral with and projecting endwise from said end walls and affording dimensional compensation with said end walls to cover a length equal to said wooden carrying case;

(f) and coupling structure on said side walls comprising a longitudinally extending interlock flange projecting downwardly on one of said side walls and defining an elongated downwardly opening coupling groove, and a complementary longitudinally extending interlock flange projecting upwardly on the other of said side walls and adapted for interlocking interengagement within said coupling groove of another like carrier, said interlock flanges extending outwardly to a predetermined dimension such that in the coupled relation two of the carriers occupy substantially the same space as a twenty-four bottle wooden carrying case.

12. In a molded plastic bottle carrier dimensioned to occupy substantially one-half of the space of a twenty-four bottle wooden carrying case for the same size range of beverage bottles:

(a) a base wall and side and end walls of thin cross-section and defining an elongated upwardly opening tray;

(b) a central longitudinally extending upwardly projecting divider joined to said base wall and at its opposite ends to said end walls;

(c) a handle rising from said longitudinal divider;

(d) transverse thin dividers rising from said base wall and joining the side walls and said longitudinal divider and cooperating with one another and with said end walls to divide the tray into two equal parallel rows of substantially equal bottle-receiving cells;

(e) handles integral with and projecting endwise from said end walls and affording dimensional compensation with said end walls to cover a length equal to said wooden carrying case;

(f) and coupling structure on said side walls comprising a longitudinally extending interlock flange projecting downwardly on one of said side walls and defining an elongated downwardly opening coupling groove, and a complementary longitudinally extending interlock flange projecting upwardly on the other of said side walls and adapted for interlocking interengagement within said coupling groove of another like carrier, said interlock flanges extending outwardly to a predetermined dimension such that in the coupled relation two of the carriers occupy substantially the same space as a twenty-four bottle wooden carrying case, each of said interlock flanges being connected to its respective wall by a thickened reinforcing offset.

13. A one-piece molded shell plastic bottle-carrier comprising:

(a) base, side and end walls defining an upwardly opening tray and dividers extending above said base and between said side and end walls and subdividing the tray into a plurality of upwardly opening bottle-receiving cells;

(b) and means for assembling the carrier with another like carrier to provide a coupled-twin assembly and comprising a downwardly projecting hook-like interlock flange extending longitudinally along the outer side of one of said side walls and defining a downwardly opening socket groove, and an upwardly extending interlock flange longitudinally along the outer side of the opposite side wall complementary to said downwardly projecting interlock flange and socket groove and adapted for interlocking interengagement within the socket groove of the downwardly projecting interlock flange of a like carrier, said hook-like flange comprising a rib-like web along the top of said socket reinforcing said one side wall and joined at its ends to said end walls and intermediately joined to said dividers which extend between said side walls.

14. A one-piece molded shell plastic bottle-carrier comprising:

(a) base, side and end walls defining an upwardly opening tray and dividers extending above said base and between said side and end walls and subdividing the tray into a plurality of upwardly opening bottle-receiving cells;

(b) and means for assembling the carrier with another like carrier to provide a coupled-twin assembly and comprising a downwardly and outwardly projecting hook-like flange structure extending longitudinally along and comprising the upper edge of one of said side walls and defining a downwardly opening socket groove, and an upwardly extending interlock flange longitudinally along and comprising the upper edge of the opposite side wall complementary to said hook-like flange structure and socket groove and being at a slightly lower elevation so as to be adapted for interlocking interengagement within said socket groove of the hook-like flange structure of a like carrier.

15. A molded plastic shell bottle carrier of the character described comprising:

(a) a base having longitudinally extending side walls and end walls joined to provide an upwardly opening tray;

(b) central longitudinally extending divider integral with said bottom wall;

(c) and a handle on the outside of said one end wall including a handle bar extending parallel in spaced relation to said end wall and substantially co-extensive with the width of said end wall, longitudinally extending end flanges integrally joining said handle bar and aligned with said side walls, and a central reinforcing and connecting web flange joining said handle bar centrally with the adjacent end of said longitudinally extending divider.

References Cited by the Examiner

UNITED STATES PATENTS

| | | |
|---|---|---|
| D. 171,132 | 12/1953 | Hudson. |
| 2,535,493 | 12/1950 | Gerber. |
| 2,821,327 | 1/1958 | Glazer _____ 220—102 |
| 2,826,332 | 3/1958 | Hudson _____ 220—104 X |
| 3,055,542 | 9/1962 | Russo _____ 220—104 |
| 3,131,829 | 5/1964 | Masser _____ 220—102 |
| 3,148,797 | 9/1964 | Cloyd. |
| 3,178,052 | 4/1965 | Bromley _____ 220—102 |

FOREIGN PATENTS 1,316,652   12/1962   France.

GEORGE O. RALSTON, *Primary Examiner.*